United States Patent [19]
McLean

[11] Patent Number: 4,703,161
[45] Date of Patent: Oct. 27, 1987

[54] RUGGEDIZED CALCULATOR

[76] Inventor: Roger D. McLean, 2111 W. Dixon, Mesa, Ariz. 85201

[21] Appl. No.: 913,713

[22] Filed: Sep. 30, 1986

[51] Int. Cl.⁴ .............................................. G06C 5/02
[52] U.S. Cl. ................................... 235/1 D; 200/301; 200/302.1; 206/523; 206/592; 206/811
[58] Field of Search .......... 235/1 A, 1 D, 1 R, 145 R; 200/5 A, 301; 206/521–523, 584, 588, 592–594, 811; 312/7.1, 21, 27; 150/52 R; 361/390, 391, 394, 399

[56] References Cited

U.S. PATENT DOCUMENTS

| | | | |
|---|---|---|---|
| 3,769,741 | 11/1975 | Hessler et al. | 206/523 X |
| 4,295,179 | 10/1981 | Read | 206/523 X |
| 4,567,354 | 1/1986 | Sekive | 200/5 A X |
| 4,573,573 | 3/1986 | Favaro | 150/52 R X |

*Primary Examiner*—Benjamin R. Fuller
*Attorney, Agent, or Firm*—LaValle D. Ptak

[57] ABSTRACT

This invention provides a ruggedized calculator having shock-absorbant layers around a relatively unbreakable hard plastic case. Flotation cells enable this unit to float and various seals render it dust-proof and water-tight. Power can be selectively supplied from a solar unit or rechargeable batteries. The keypads are large so they can be manipulated with gloves on and membrane switches prevent dirt, dust, and moisture from reaching the electronics package.

10 Claims, 4 Drawing Figures

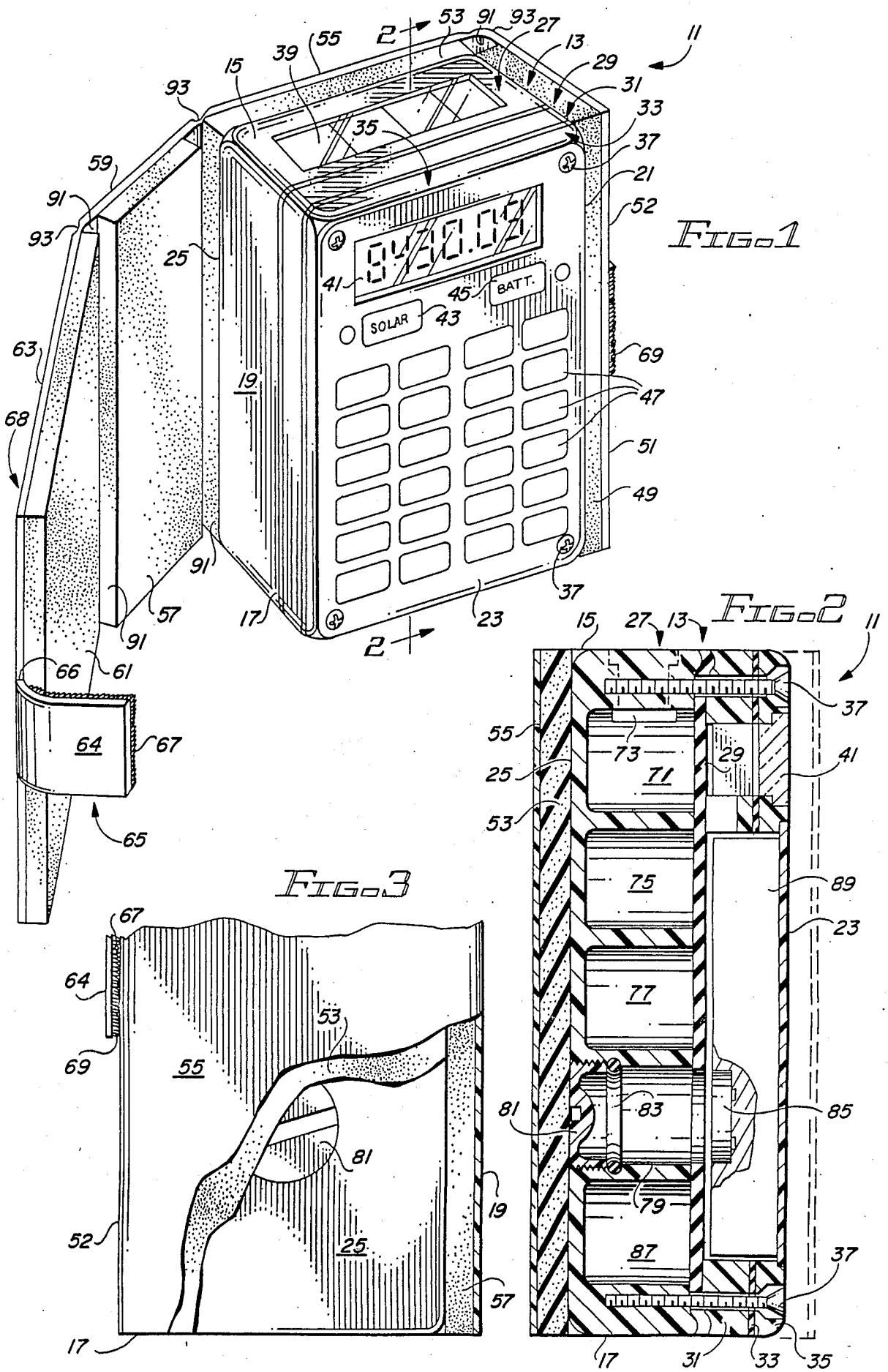

RUGGEDIZED CALCULATOR

BACKGROUND OF THE INVENTION

1. Field of the Invention

The present invention relates generally to calculators, and more particularly to a ruggedized calculator which is substantially waterproof, dust proof, shock proof, and unbreakable.

2. Description of the Prior Art

Most of the calculators of the prior art are encased in plastic, and those intended generally for rugged use, by architects, civil engineers, surveyors, and others those working outdoors were simply provided with a thicker or more durable plastic casing about the calculator. However, most such calculators break if dropped upon the ground or a hard surface; sink if dropped in a puddle of water; admit water and dust which would eventually ruin the circuitry of the calculator; and could be easily broken, shattered or the electronics within the calculator casing destroyed by shocks, sharp contacts, and the like.

The ruggedized calculator of the present invention solves substantially all of the problems of the prior art and provides a ruggedized, floatable, waterproof, dust proof, shock resistant and highly durable and unbreakable calculator apparatus for use both indoors and outdoors in all areas where the user puts the calculator to rough use such as by architects, plumbers, carpenters, builders, civil engineers, surveyors, contractors, construction crews, and the like.

BRIEF SUMMARY OF THE INVENTION

It is an object of the present invention to provide a highly ruggedized calculator able to withstand harsh environments.

It is another object of the present invention to provide a calculator packaged so that is substantially waterproof, dust proof, shock resistant, durable and relatively unbreakable.

It is still another object of the present invention to provide a calculator package which is floatable.

It is a further object of the present invention to provide a ruggedized calculator construction which can operate from either a solar cell power source or a battery power source, as desired.

It is yet a further object of this invention to provide a calculator packaging apparatus including a plurality of floatation cells for rendering the finished unit floatable.

It is yet another object of the present invention to provide an insulated casing about the calculator itself box for shockproofing the calculator.

It is still another object to provide a hard, relatively unbreakable, plastic casing about the foam-covered calculator apparatus for rendering same durable and relatively unbreakable.

The present invention contemplates a calculator apparatus or structure for use in rugged, harsh and unusual environments. The calculator includes a first generally rectangular box-like housing. The housing includes a generally rectangular box-like portion having a back panel, a top panel, a base panel, a pair of side panels and a face panel. The face panel includes a plurality of generally cylindrical cell-like air pockets formed therein for enabling the package to float. A generally rectangular slot is provided above the plurality of cell-like pockets. At least one solar cell is operatively disposed within the rectangular slot and a light-emitting window is operatively disposed on the top panel of the box-like portion for admitting light to the at least one solar cell housed within the rectangular slot.

A generally rectangular cushion member is adapted to be operatively disposed over the face panel, and the cushion member includes a generally rectangular aperture sized to access the rectangular aperture of the box-like portion and a large generally rectangular aperture to expose the plurality of cell-like pockets thereto. A generally rectangular mounting panel or member is adapted to be operatively disposed over the cushion member. The mounting panel includes a generally rectangular opening sized to open on the rectangular aperture of the cushion means, and a generally rectangular aperture sized to expose at least a portion of the cell-like pockets therethrough. A generally rectangular digital display panel having a display surface is adapted to be housed within the generally rectangular slot of the mounting panel and an electrical package including calculator circuits and passitive type key pads is adapted to be housed within the relatively large rectangular opening of the mounting panel.

A gasket-like, relatively thin seal is adapted to be disposed over the front surface of the mounting panel, and a front face plate having a generally rectangular opening for displaying the face of the digital display is provided. A plurality of generally rectangular apertures are also provided for exposing the key members for access to the user. A pair of light-emitting diodes is used to indicate whether the calculator is being run off of the solar cells or off of a dry cell battery.

The back and sides of the assembled unit are covered by panels including a relatively thick layer of foam-like insulating material and an outer layer of relatively unbreakable plastic. The inside surface of the foam-like material is adapted to be glued or adhesively attached to the back surface and sides of the calculator construction while the front panel serves as an access door which can be opened and closed manually to expose the key pads and digital readout as desired.

The resulting calculator is extremely rugged, capable of use in all types of hazardous, hostile, and unfavorable environments and includes favorable features such as floatability, water tightness, dust protection, and protection against breakage from impact or sharp contacts.

These and other objects and advantages of the present invention will be more fully understood after reading the detailed description of the preferred embodiment of the present invention, the claims, and the drawings which are briefly described hereinbelow.

BRIEF DESCRIPTION OF THE DRAWINGS

FIG. 1 shows a perspective view of the ruggedized calculator construction of the present invention;

FIG. 2 is a sectional side view of the calculator of FIG. 1 taken along view lines 2—2 thereof;

FIG. 3 is a blown-up partial sectional view of a portion of the rear of the ruggedized calculator of FIG. 2 showing the battery access number.

DETAILED DESCRIPTION OF THE PREFERRED EMBODIMENT

Figure 4:
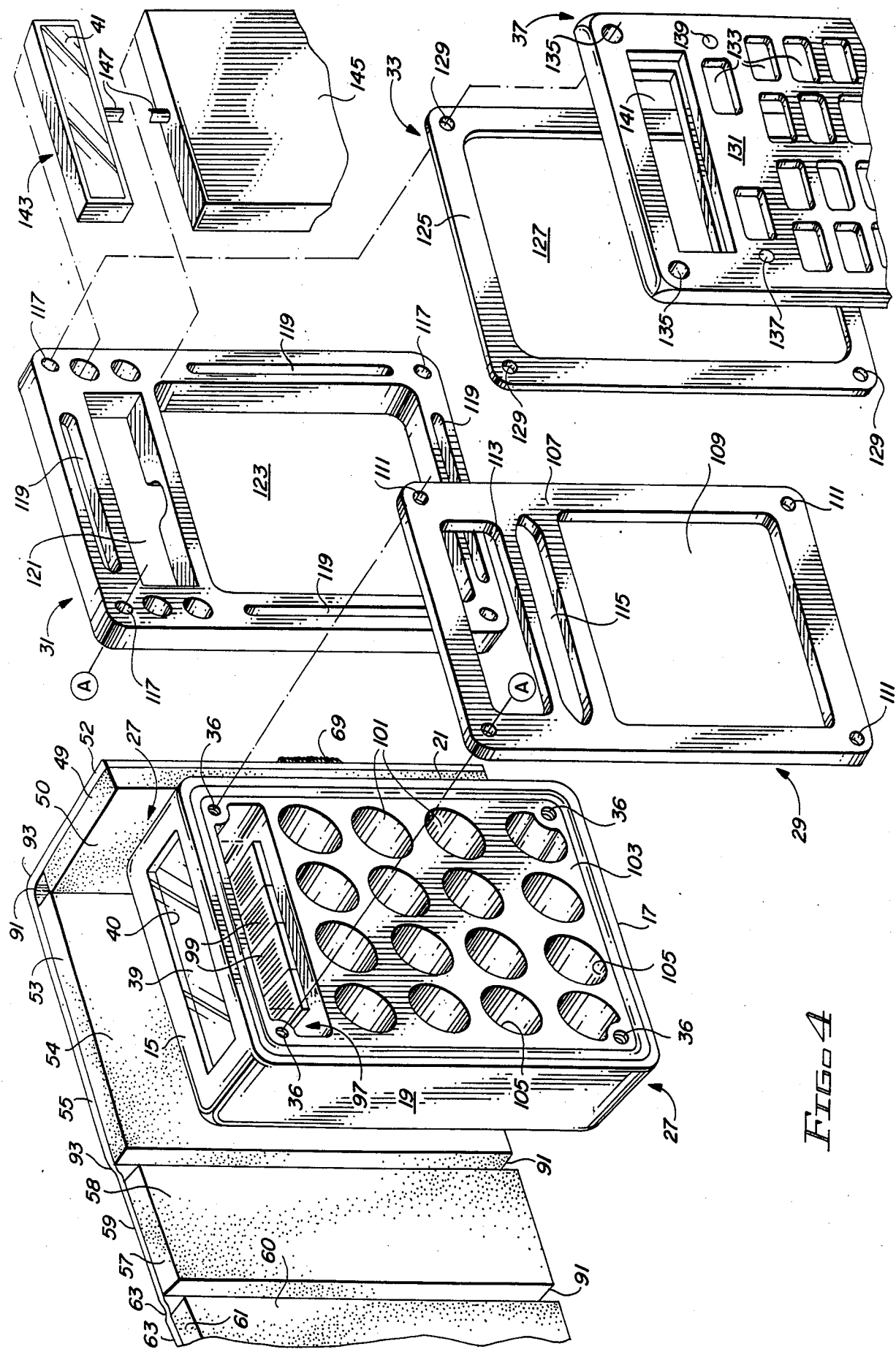
FIG. 4 is a perspective exploded view of the ruggedized calculator of FIG. 1.

FIG. 1 shows the ruggedized calculator 11 of the present invention. The calculator assembly 11 includes a generally rectangular calculator body 13 having a top panel or surface 15, a bottom panel or surface 17, a left side panel 19 and a right side panel 21. The calculator assembly 11 also includes a front panel 23 and a rear panel 25.

The calculator assembly 11 of the present invention is made from various portions or sections which are sandwiched together to protect the electronics of the calculator. Sandwiched portions include a floatation self-containing portion 27, a cushion seal portion 29, a mounting frame 31, a thin gasket-like seal 33, and a face cover plate 35. The entire assembly of sandwiched sections are held together by conventional screws 37 or the like. A solar window 39 is operatively disposed centrally on the top surface 15 of the floatable portion 27. The front face panel 35 includes digital display readout 41, a solar cell on indicator 43, a battery "on" indicator 45, and a plurality of key pad apertures 47. The box-like housing 27 is surrounded by an outer covering which includes a series of insulation panels and a series of relatively unbreakable plastic outer covers thereover.

The outer covering includes a first side insulation panel 49 and an outside plastic cover 51; and an outer surface 52. It also includes a layer insulation panel 53 and a rear outer cover 55. A second side insulation panel 57 is covered by second side cover or casing 59, and a face access panel 61 is covered by a plastic face cover 63. A portion between the adjacent panels include spaces or gaps 91 and bendable hinge portions of the outer plastic cover represented by reference numeral 93. The central portion of the distal end 66 of the front access door or access cover 68 has attached thereto a closure member 65 including a strap member 64 having at least one of a male hook pad and a female loop pad 67 operably secured to the inside surface thereof. The connector or fastener assembly is referred to by reference numeral 65 and a corresponding opposite one of a male hook pad and a female loop pad 69 is secured to a central side portion of the outside surface 52 of the first side panel 51. In this manner, the access door portion 68 including the foam panel 61 and the outer plastic covering 63 can be selectively opened for access to the key apertures 47, for viewing the LED indicators 43 and 45 and the face of the digital readout panel 41. Alternatively, when the calculator is not in use, the access cover 68 can be closed over the face 23 and the strap pad 67 secured to the strap pad 69 for locking the access door 68 and protectively covering the front surface 35 of a calculator housing. The inside surfaces of the side foam panels 49 and 57 and the rear foam panel 53 are adhesively secured to the opposite sides 21 and 19 and the rear surface 25 of the box-like housing 27 for protection purposes.

FIG. 2 shows a sectional side view of the ruggedized calculator assembly of FIG. 1. In FIG. 2, sandwiched panels or portions including the box-like, floatation cell housing 27, a cushion member 29, the mounting frame 31, the thin gasket-like member 33 and the front panel 35 sandwiched together and attached between the front portion 23 and the box-like floatation cell housing 27 by conventional fastening means such as the screw-like members 37. FIG. 2 shows the inside surface of the rear foam panel 53 adhesively secured to the rear surface 25 of the calculator housing 13 while the outer casing 55 of relatively unbreakable plastic material is secured to the opposite side of the foam layer 53. The foam layer 53 and outer casing 55 are shown as covering a threaded access 81 to a cell 79 for housing a battery 85. An O-ring seal 83 is provided between the battery 85 and the outer walls of the cell 89 to prevent moisture or dust from getting into the electrical compartment as hereinafter described.

The box-like housing portion 27 is shown as including a plurality of layer filled floatation cells 71, 75, 77, and 87. The cells 71 are shown as including at least one photovoltaic or solar cell 73 therein and access is had to the light on the outside of the calculator through the solar cell window 39 of FIG. 1. It will be seen that the rectangular digital readout 41 is housed within the rectangular slot at the top of the mounting member 31 through the window 41 of the front face panel 23. Likewise, the electrical circuitry and key members 89 are housed within the large rectangular portion of the mounting member 31 covered by the outer plate 33.

FIG. 3 shows a cut-away portion of the rear 55 of the ruggedized calculator 11 of FIG. 2 for illustrating the battery access screw member 81 which is on the rear surface 25 of the box-like housing portion 27 and which is covered by the relatively thick rear foam layer 53 whose inside surface is adhesively secured to the rear surface 25, and whose opposite surface is adhesively secured to the inside surface of a hard unbreakable plastic casing material 55. Furthermore, the hook and loop pads 67 and 69 of the fastener strap 64 are shown as being closed upon one another for shutting the access door 68 over the front panel 23 for protecting same.

FIG. 4 is an exploded perspective view of the ruggedized calculator assembly of FIG. 1. In FIG. 4, the cell-containing box-like housing portion 27 is shown as including the top surface 15 provided with an aperture 39 defined by the cut out portion 40 thereof. The box-like housing 27 further includes a rear surface panel 25, a bottom panel 17, a left side panel 19 and a right side panel 21. A front or face panel 103 is shown as including a plurality of apertures 105 leading to cell-like pockets 101 which are filled with air for floatation purposes. Apertures 105 are placed in a front surface 103 of the front panel 23 and threaded apertures are provided at the four corners as indicated by apertures 36.

Next, in the sandwich construction comes a generally rectangular gasket-like sheet of relatively thick cushion material 29. The portion 29 includes a generally rectangular aperture 113 sized to be operatively disposed over the rectangular aperture 97 of the box-like housing portion 27 and further includes a large generally rectangular or square aperture 109 disposed beneath the rectangular aperture 113 and defined by the framing portion 107. A weight-reduction slot 115 is also included. The four corners of the member 29 include screw receiving apertures 111 adapted to be aligned with a threaded apertures 36 of the box-like housing portion 27 previously described.

Next in the sandwich construction comes a relatively thick generally rectangular mounting frame or mounting member 31. This member includes an upper generally rectangular aperture 121 which is used as an aperture or access cavity and a relatively large square or rectangular access cavity 123. The member 31 is also provided with a plurality of weight-reducing apertures or slots 119 and four apertures 117 at the opposite corners which are adapted to be aligned with the apertures in the corners of the cushion member 29 as previously described. A digital display or readout 143 is generally rectangular and has a face 41. The generally rectangular digital display 143 is adapted to be operatively received in and carried by the generally rectangular slot portion 121 of the mounting member 31. Similarly, a generally rectangular electronic package 145 is adapted to be operatively received within and carried by the large square or rectangular portion 123 of the mounting member 31. The electronic package 145 includes the conventional calculator circuitry and membrane type capacitive keys. Both the readout 143 and the electronics 145 have electrical connections 147.

Next in the sandwich construction comes a generally, gasket-like, relatively thin member 125 having a large rectangular central apertures 127 and four apertures 129 in the opposite corners thereof which are adapted to be aligned with the apertures 117 of the mounting frame 31.

Lastly, the outer face plate 37 is provided and it includes threaded apertures 135 at each of its corners which are adapted to be aligned with the apertures 129 in the corners of the gasket-like seal 125. The front surface 131 of the front plate 37 further includes a plurality of generally rectangular apertures 133 for accessing the keys of the calculator contained in the electrical package 145 thereunder. First LED aperture 137 is used to house a light-emitting diode for signaling or indicating whether or not the solar cells 99 are being used to power the calculator while the LED cell 139 is adapted to contain a second light-emitting diode whose illumination indicates that the battery and not the solar cells are presently powering the calculator. Lastly, a top central, generally rectangular aperture 141 coincides with the rectangular apertures 121, 113 and 97.

Lastly, a plurality of foam-like insulation panels with outer layers of relatively unbreakable plastic material are provided. A right side foam panel 49 is shown as having its inner surface 50 adhesively secured to the outer surface 21 of box-like housing 27 while the outer side of the foam panel 49 is adhesively secured to the inside surface of a plastic casing 52. A gap or space 91 is provided adjacent a hingeable fold or bent portion 93 of the outer plastic casing between casings 52 of the right side portion and casing 55 of the rear portion.

The rear includes a relatively thick layer of foam material 53 having its inner surface 54 adhesively secured to the rear surface 25 of the box-like housing portion 27 while the opposite surface of the foam layer 53 is adhesively secured to the inside surface of the plastic casing 55. Again, a gap 91 is provided between the rear panel 53 and casing panel 55 and the adjacent left side foam panel 57 and outer casing panel 59. The gap 91 hinges both sides of a hingeable fold 93 for enabling the sides 57 and 59 to be bent around side surface 19 of the box-like housing 27. The inner surface 58 of the foam panel 57 is adhesively secured to the outer surface of the left side 19 of the box-like housing 27 while the opposite or outer surface of the foam layer 57 is secured to the inside surface of the outer plastic panel or casing 59. Again, a gap 91 on both sides of a hingeable fold 93 separate the side panels 57, 59 from the door access assembly 68 including the relatively thick foam panel 61 and the outer casing 63. The inner surface 60 of the foam panel 61 is not fixedly secured or adhesively fixed to the front surface 37 is adapted to be removably secured thereover for protecting the front surface during periods of non-use and manually openable for granting access to the keys in the apertures 133 of the front panel 37 and visual access to the face 41 of the digital read out to 143 accessed through the window 141.

It will be understood by those skilled in the art that various modifications, alterations, changes, substitutions, and adaptations can be made in the apparatus of the present invention without departing from the spirit and scope thereof which is limited only by the appended claims.

I claim:
1. An improved calculator comprising:
   electronic circuit means including a plurality of conventional keypad switchs;
   a digital readout displaym eans;
   a carrier frame for operatively housing said digital read out display means and said electronic circuit means including said keypad switches;
   means for covering the rear of said frame, said covering means including means for enabling said calculator to float;
   means for housing a source of potential in said frame for operating said electronic circuit means;
   means for covering the front of said frame with a face panel having apertures for said keypad switches and said digital display means;
   an outer casing including a rear panel, a pair of side panels, and a front access panel, each of said panels including a relatively thick layer of foam means attached to an exterior layer of relatively unbreakable plastic casing material;
   said front access panel being hingedly secured to one of said side panels for selectively opening and closing access to said keypad switches and digital display means of said calculator.

2. The improved calculator of claim 1 wherein said means for enabling said calculator to float includes a plurality of right cylindrical air pockets operatively carried by said covering means, said pockets being filled with air for enabling said improved calculator to float.

3. The improved calculator of claim 1 further including sealing means for rendering said electronic circuit means including said keypads and said digital display means waterproof, dust proof, shock proof, and protected from breakage.

4. The improved calculator of claim 1 wherein said frame includes a window aperture; and said source of potential includes at least one solar cell housed within said aperture for receiving light therethrough to provide said operating electrical potential.

5. The improved calculator of claim 1 wherein said source of potential is a conventional battery.

6. The improved calculator of claim 5 wherein said battery is rechargeable.

7. The improved calculator of claim 1 wherein said source of potential includes at least one solar cell and a battery; and said frame includes a window aperture for supplying light therethrough to said solar cell; and further including means for selecting between which one of said solar cell and said battery are used at a given time to provide potential for operating said electronic circuit means of said calculator.

8. The improved calculator of claim 7 further including indicator means for indicating which one of said at least one solar cell and said battery is powering said calculator.

9. The improved calculator of claim 8 wherein said indicator means includes light emitting diodes.

10. An improved calculator comprising:
    electronic circuit means including a plurality of conventional keypad switches;
    a digital read out display means;
    a carrier frame for operatively housing said digital read out display means and said electronic circuit means including said keypad switches;

means carried by said carrier frame for enabling said calculator to float;

means for housing a source of potential in said frame for operating said electronic circuit means;

means for covering the front of said frame with a face panel having apertures for said keypad switches and said digital display means;

an outer casing including at least a rear panel and a front access panel, each of said panels including an exterior layer of relatively unbreakable plastic casing material;

said front access panel being hingedly secured to said rear panel for selectively opening and closing access to said keypad switches and digital display means of said calculator, wherein with said front access panel closed, said calculator is protected against damage.

* * * * *